Figure 1:
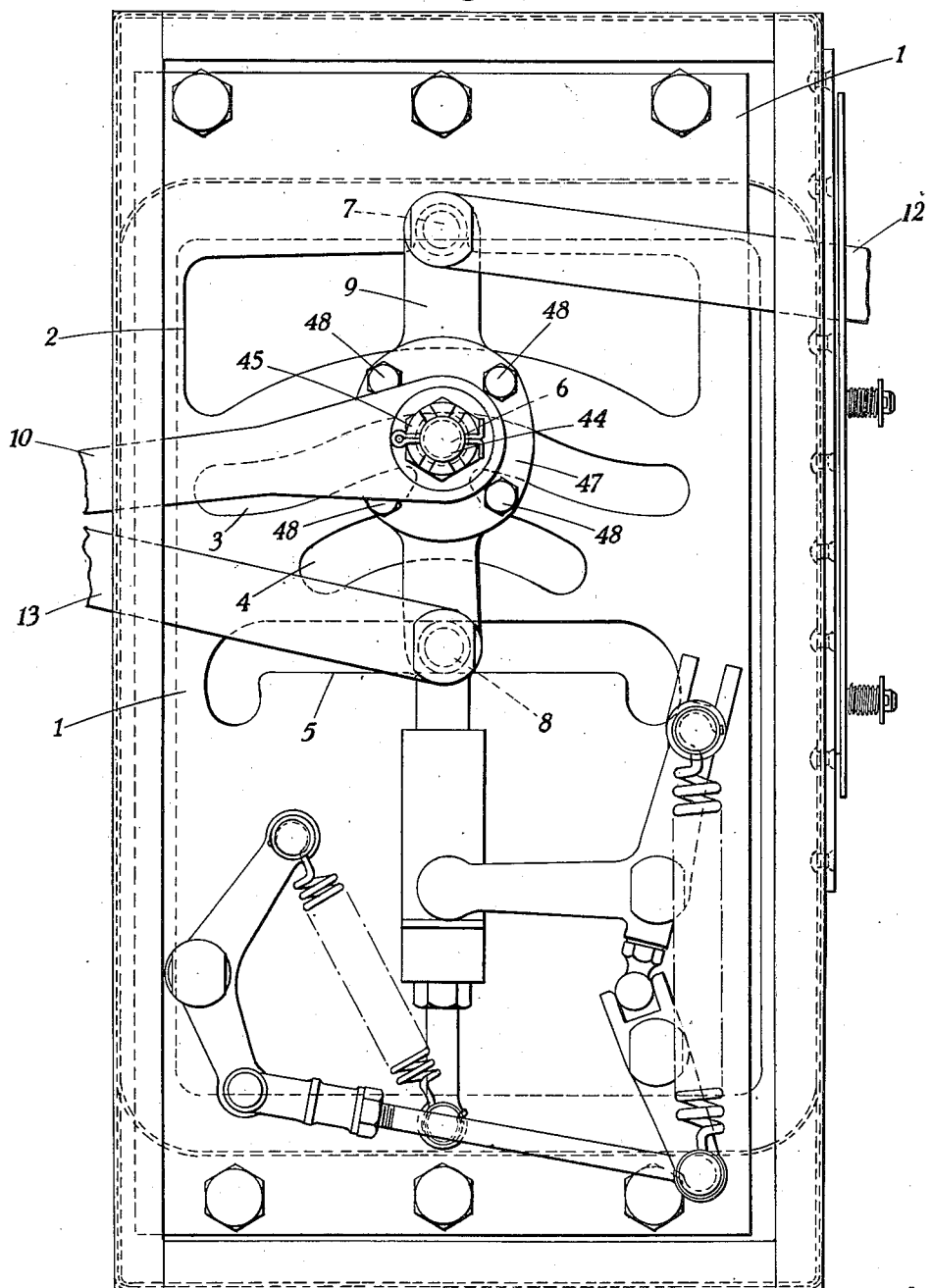

Oct. 8, 1940.  J. N. H. TAIT ET AL  2,217,572
MOTOR VEHICLE
Filed Jan. 12, 1940   2 Sheets-Sheet 1

Inventors
John N. H. Tait
William M. Blagden
by
Ravens L Bateman
Attorney

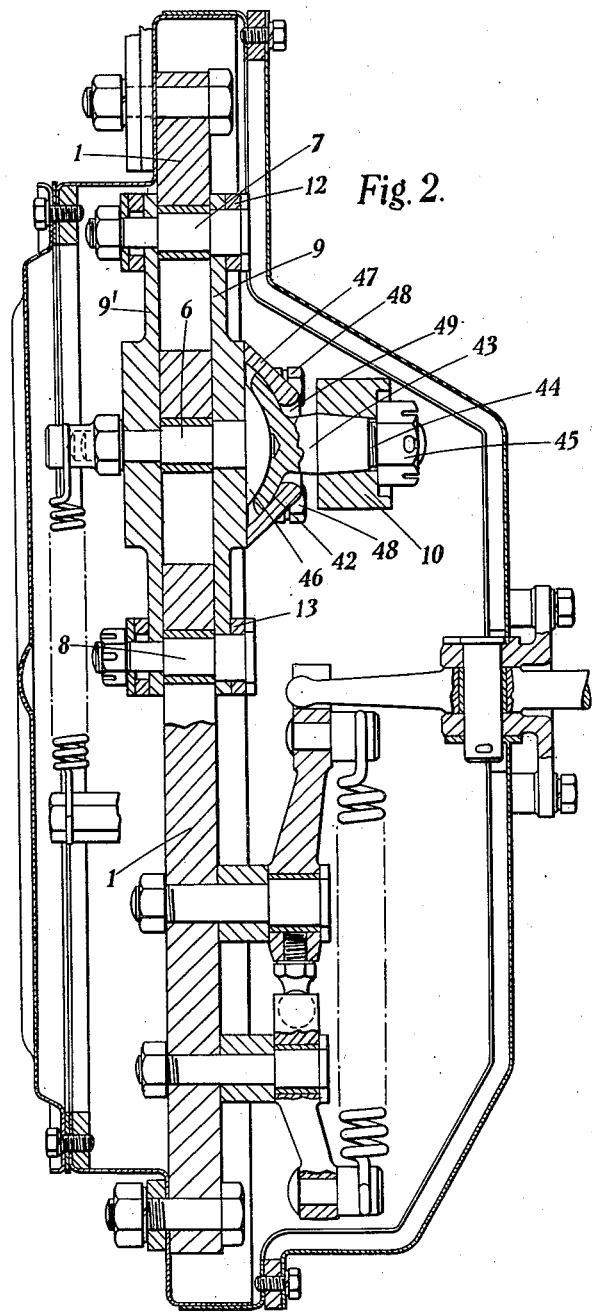

Patented Oct. 8, 1940

2,217,572

UNITED STATES PATENT OFFICE 2,217,572

MOTOR VEHICLE

John Noel Hutton Tait, Coventry, and William Martin Blagden, Farnborough, England, assignors to The Birmingham Small Arms Company Limited, Birmingham, England, a British company Application January 12, 1940, Serial No. 313,483
In Great Britain November 21, 1938

4 Claims. (Cl. 280—91)

This invention relates to motor vehicles of the kind provided with means for steering of such vehicles when travelling in either direction, and refers more particularly to mechanism of the kind described in application Ser. No. 313,484, filed Jan. 12, 1940, wherein a common steering mechanism is provided for both the front and rear wheels, and co-operation between the steering mechanism and the wheels is effected by a laterally displaceable rocking lever in conjunction with a fixed guide plate, said rocking lever being connected at opposite ends respectively to the front and the rear steering wheels and provided with pivot pegs arranged for engagement with either one of two oppositely disposed pivot recesses in the fixed guide plate, a central pivot on said rocking lever connected through an arm or rod to the steering box on the steering column and arranged to engage with curved or segmental guide grooves formed in the fixed guide plate, said grooves being connected by a central gap or gate arranged to permit of movement of the said central pivot pin into engagement with either one of the said central guide grooves, and on opposite sides of said guide plate are formed outer guide grooves arranged to permit of movement therein of one of the outer pivot pins on the rocking lever when the other outer pivot pin on said lever is pivotally engaged with its recess in the guide plate. One of the aforesaid outer grooves is so shaped at the ends thereof that when the pivot pin, which moves therein in the steering of the front wheels, approaches either end of said groove, it is caused to move outward into a pivot recess and simultaneously withdraws the pivot pin at the other end of the rocking lever from its central pivot recess, thus permitting a movement of the rocking lever to effect a turning or steering movement of the rear wheels in an angular direction opposite to that which is then assumed by the front wheels, and thus provide for a sharp turning movement of the vehicle. The aforesaid rocking lever is adapted to be normally retained in the position before described for effecting a progressive steering of the front and the rear wheels when the vehicle is running in a forward direction, which in a convenient arrangement can be effected by means of a spring or springs.

In steering mechanism of the aforesaid kind, wherein the rocking lever is connected by an arm or link with a steering box drop arm which swings in a vertical plane, the swinging movement of said drop arm involves ball jointed connections of the arm or link to the said drop arm and rocking lever respectively. Lack of space prevents the centre of a ball joint of conventional design, mounted on said rocking lever, being located other than at a distance above or below the centre line of said rocking lever. The force exerted to move said rocking lever by said arm or link is virtually applied to the center of said ball joint mounted on said rocking lever and, because said centre is at a distance above or below said rocking lever centre line, a tilting movement is applied to said rocking lever proportional to the product of said distance and the force applied. This tilting movement causes a tendency for the edges of said rocking lever to dig into said fixed guide plate and to cause a binding action of said rocking lever on said fixed guide plate, resulting in stiffness and difficulty in operating the steering of the vehicle.

According to the present invention, however, the actuating arm or the like associated with the steering box of the vehicle is connected to the rocking lever controlling the steering of the front and rear wheels by means of a ball joint so constructed and arranged that its centre is disposed at or near the centre line of the said rocking lever, thereby preventing or reducing the said tilting movement and thus facilitating the steering of the vehicle.

According to the preferred arrangement the rocking lever controlling the steering comprises two bars mounted on each side of the fixed guide plate and connected together by a central pivot or hinge pin and two outer pivot pins arranged to engage with guide grooves in the fixed guide or master plate, and the aforesaid central pivot pin is provided with a mushroom or part spherical shaped head formed by a radius from a centre at or near the mid distance between the said two bars, adapted to be engaged by a cup-shaped or part spherical seating provided on its uppper part with a stem adapted to be fixed in the end of the arm or link connected to the steering drop arm of the steering box, the said parts being operatively connected by a housing fixed to the outer face of the rocking lever and adapted to permit of an angular movement of the axis of the cup-shaped part of the connection in relation to the axis of the central pivot pin, thereby greatly reducing or entirely obviating any tendency to tilt the rocking lever.

The invention will be more completely understood from the following detailed description, which is given in conjunction with the accompanying drawings, in which:

Figure 1 is a plan view of a master guide plate for controlling the steering of the front and rear wheels and embodying a linkage mechanism constructed in accordance with the invention, while Figure 2 is a sectional side view of the arrangement shown in Figure 1.

Referring now to these drawings, we provide a master or guide plate 1 which is adapted to be fixed by any convenient means between the longitudinal side members of the frame of the vehicle, the said guide plate having formed therein four longitudinally disposed guide grooves 2, 3, 4, 5, the two inner grooves 3, 4 being arranged to co-operate with a central pivot pin 6, and the two outer grooves 2 and 5 being arranged to co-operate with the two outer pivot pins 7 and 8, all three pins being mounted on a rocking lever 9 which is movably mounted on said guide plate 1 and which has a central pivot pin 6 which is pivotally connected, by means to be hereinafter described, to an arm or link 10 which connects with the operating arm of the steering box, the outer pivots 7 and 8 of said rocking lever 9 being connected by the arms 12 and 13, through a suitable linkage system, with the rear and front steering wheels, the aforesaid guide grooves be being shaped and disposed, in the manner described in the aforesaid application, so as to permit of movement being imparted to the rocking lever 9 to effect the steering of the front wheels, or a combined movement of the front and the back wheels when the vehicle is moving in a forward direction, and also provide for the locking of the front wheels and the steering of the rear wheels when the reverse gear is put into operation and it is desired to move the vehicle in a rearward direction.

The rocking lever, as may be seen from Figure 2, comprises two bars 9, 9' mounted on each side of the guide plate 1 and connected together by the central pivot or hinge pin 6 and the two outer pivot pins 7, 8 which are arranged to engage with their respective guide grooves in the master plate 1.

For the purpose of connecting the arm or link 10 with the rocking lever 9, we provide a member comprising a part spherical or cup-shaped seating 42 having formed on its upper side a stem part 43 which is preferably tapered as shown and arranged to engage with a tapered hole in the end of the arm or link 10 connected to the steering drop arm of the steering box, the upper end 44 of said stem part being screw-threaded to receive a nut 45 whereby it is adapted to be fixed to the end of the aforesaid arm or link 10. The head 46 of the central pivot 6 of the rocking lever 9 is of part spherical formation, corresponding to the cup-shaped part 42 of the aforesaid member, and the latter is further provided with an outer part spherical formation adapted for engagement with a similarly shaped face or seating formed in a housing 47 which is fixed to the outer face of the rocking lever by means of set screws 48 or other convenient means. The size of the aperture 49 in the aforesaid housing 47 in relation to the stem of the attachment member which protrudes through said aperture, and the size of the part spherical head 46 of the central pivot in the relation to the part spherical seating in the aforesaid housing 47, are such that will permit of an angular movement of the axis of the said attachment member in relation to the axis of the central pivot, thereby obviating or greatly reducing the tendency to tilt or bind the rocking lever 9 when being moved over the fixed guide plate 1 in the operation of steering.

Having thus described our invention, what we claim as new and desire to secure by Letters Patent is:

1. Steering mechanism for motor vehicles comprising a fixed guide plate and a cooperative laterally displaceable rocking lever having members connected respectively to its opposite ends for steering of the front and rear wheels of the vehicle, an actuating link for said lever, and means connecting said link to said rocking lever comprising a spherical joint connected to a side of said rocking lever and having its centre disposed at substantially the center line of said rocking lever to substantially avoid tilting movement of the rocking lever with respect to said guide plate under the operating force applied by said actuating link to said rocking lever.

2. Steering mechanism for motor vehicles comprising a grooved guide plate, a laterally displaceable rocking lever comprising a pair of bars mounted on opposite sides of said guide plate and connected together by a central pivot pin and two outer pivot pins engageable with the grooves in said guide plate, a link for actuating said lever, a part spherically shaped head on said central pivot pin having a radius from a center located substantially at the mid distance between said pair of bars, a cup-shaped part spherical seating engaging said head and provided at its outer end with a stem adapted to be fixed in the end of the link, and a housing fixed to an outer side of the rocking lever and operatively connecting said head and seating to permit an angular movement of the axis of the cup-shaped seating relatively to the axis of the central pivot pin, and thereby substantially obviating tendency of said link to tilt the rocking lever.

3. Steering mechanism according to claim 2 wherein the outer part of said seating and the inner portion of said housing have conforming spherically shaped surfaces, said housing having an aperture and said seating having its stem protruding through said aperture for attachment to said link, said aperture being sufficiently large to permit angular movement of said stem with respect to the axis of said central pivot pin.

4. Steering mechanism according to claim 2 wherein said stem is tapered to facilitate the fixing thereof to said link, and the outer end of said stem is screw-threaded to receive a member for securing said stem in position on said link.

JOHN NOEL HUTTON TAIT.
WILLIAM MARTIN BLAGDEN.